July 2, 1935.　　　　　F. HAUG　　　　2,006,919
APPARATUS FOR COOLING HOT BISCUITS
Filed Oct. 10, 1934　　2 Sheets-Sheet 1
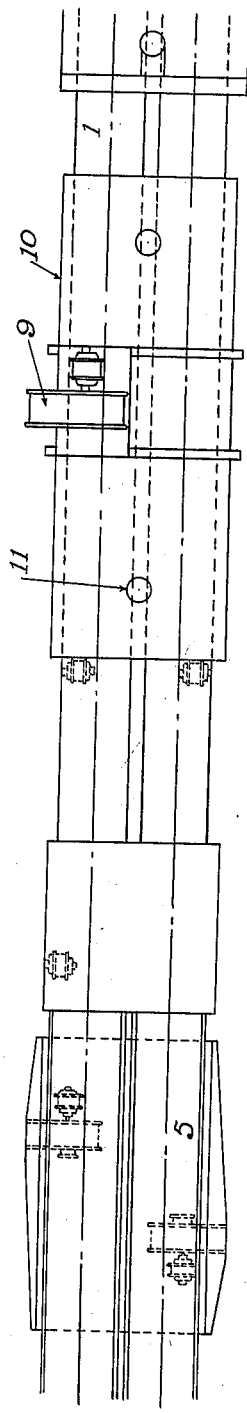
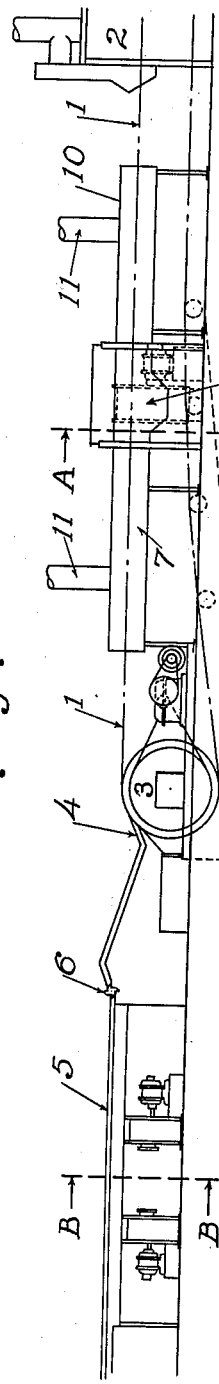
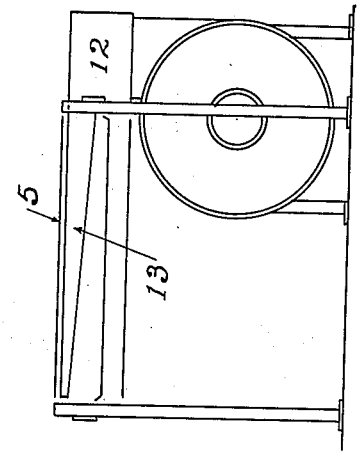
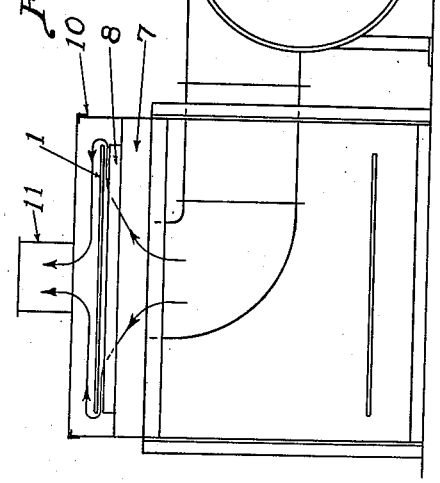
Inventor
FRIEDRICH HAUG
By George B. Willcox
Attorney

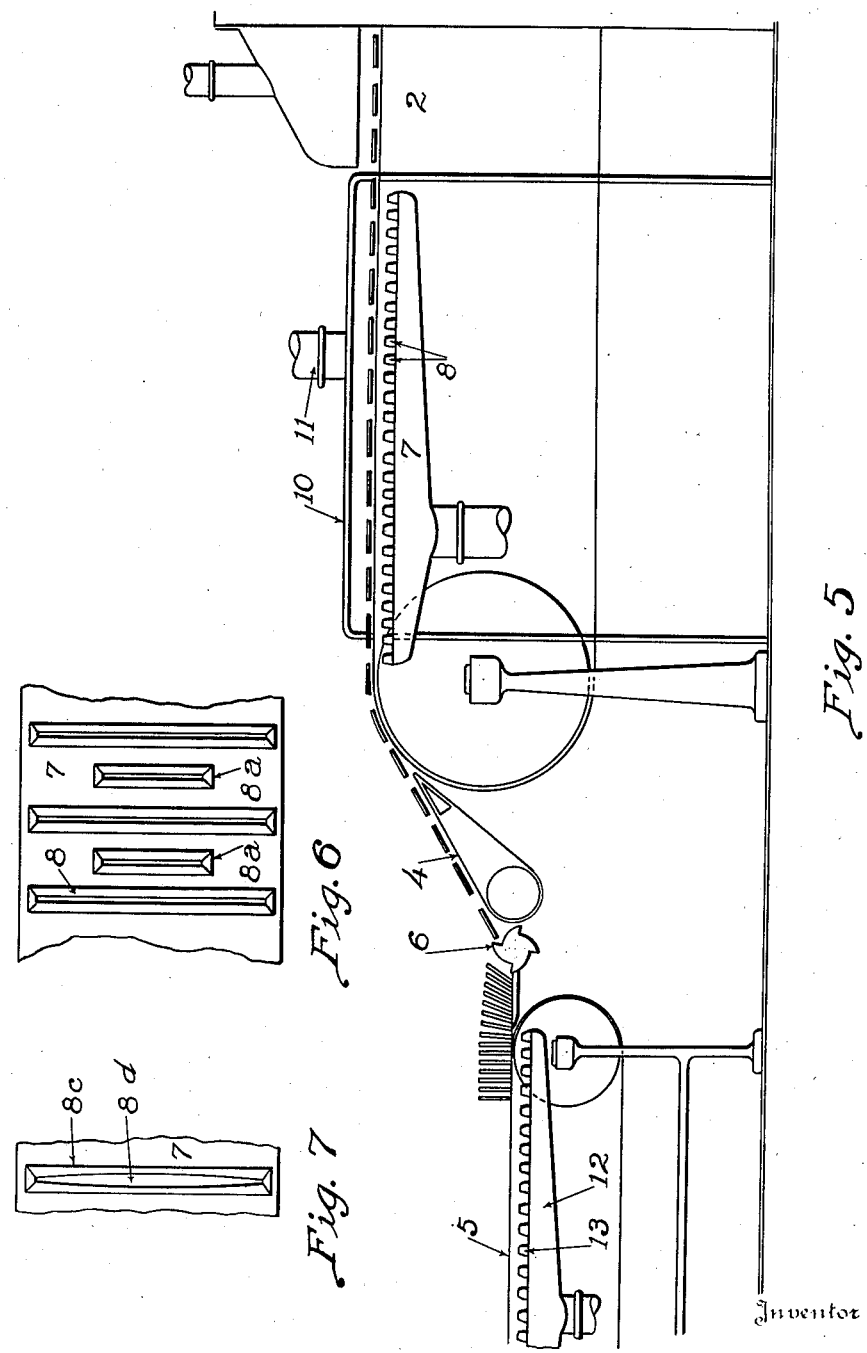

Patented July 2, 1935

2,006,919

UNITED STATES PATENT OFFICE 2,006,919

APPARATUS FOR COOLING HOT BISCUITS

Friedrich Haug, Stuttgart-Munster, Germany, assignor to Baker Perkins Company, Inc., Saginaw, Mich., a corporation of New York Application October 10, 1934, Serial No. 747,706
In Germany September 9, 1933

4 Claims. (Cl. 34—12)

This invention relates to the cooling of hot articles upon a flat band conveyor and has more particularly to do with cooling freshly baked goods, as biscuits and the like, preparatory to removing them from the oven conveyor, and with further cooling and drying the biscuits to prepare them for packing. It has for its object to provide an improved apparatus by which rapid uniform cooling may be accomplished with a minimum of expensive apparatus and at small operating cost.

A further object of the invention is to provide a more rapid cooling system than has heretofore been available. Biscuits containing a large amount of syrups, which have been baked on a wire mesh or ribbon metal band, require a substantial cooling before they can be removed from the conveyor surface without damaging them. In plants using the methods previously employed seventy-five feet or more of the oven conveyor band had to extend from the oven through the cooling zone or chamber to insure the requisite hardening of the baked goods.

In the earlier cooling tunnels or chambers enclosing the cooling conveyor runs to obtain more rapid cooling, precooled air has been blown through such tunnels countercurrent to the conveyor travel above the baked goods. This method has several disadvantages. First, considerable power was required by the air blowers to provide the large volume of cooling air necessary. The cooling of the baked goods was not uniform as their upper surfaces were cooled first, more rapidly than the steel ribbon or wire mesh conveyor upon which they rested, thus cooling the tops of biscuits much faster than their bottoms. The goods so treated had a tendency to become brittle and crack on their faces, and would tend later to become sticky. Also, this method of cooling caused the steel conveyor band to warp, since more heat was abstracted from its lateral edges than from along its middle. By the improved process and apparatus of my invention baked goods are cooled through at a uniform rate, that is, their bottoms are cooled as rapidly as their faces. A small volume of high velocity precooled air is used with maximum efficiency, and much more rapid cooling is attained, with consequent saving in operating expense and a material reduction in the size of the cooling plant. Also, by improved distribution of cooling air, the tendency of the conveyor to warp is entirely overcome.

The invention is also advantageously applied to the finish-cooling of goods, after they have been removed from the baking surface and stacked on a perforated wire mesh conveyor. Here they are ventilated effectively to remove the residual moisture in the goods at the same time as they are finish-cooled, so that their condition for packing in sealed containers is very much improved.

Further objects and advantages of the invention appear in the following specification.

Referring to the drawings, Fig. 1 is a diagrammatic top plan elevation of a biscuit cooling and packing plant, showing the invention applied to the initial cooling of the goods on a baking conveyor, and the finish-cooling and airing of the goods on a packing conveyor.

Fig. 2 is a side elevation, slightly modified, of the plant shown in Fig. 1.

Fig. 3 is a cross sectional view showing a cooling system and cooling duct taken along lines A—A in Fig. 2.

Fig. 4 is a diagrammatic cross sectional view of the cooling system, taken along lines B—B of Fig. 2.

Fig. 5 is an enlarged diagrammatic side elevation of a plant as in Fig. 2, showing the details of my preferred duct and nozzle system, as applied to the preliminary and final cooling stages of the biscuit baking and packing plant.

Fig. 6 is a fragmentary detailed top elevation of the duct and nozzles shown in Fig. 5.

Fig. 7 shows a modification of the air nozzle system shown in Fig. 6.

Referring to Figs. 1, 2 and 5, the improved cooling system is applied to a biscuit baking plant comprising a steel ribbon or wire mesh conveyor band 1 of known form extending from the outlet end of the oven 2, its outer end passing around a drum 3. Here the goods are removed from conveyor 1 by means of a transfer band 4, and deposited on a perforated packing conveyor 5 by means of a star wheel 6 of known kind. The packing conveyor 5 carries the goods on edge to the packing station.

The cooling system which treats the goods on the oven conveyor 1 consists of an air duct 7 extending longitudinally beneath the baking run of the conveyor. Duct 7 is provided with a plurality of air nozzles 8 along its upper surface, directed upwardly against the under side of the conveyor band 1. Connected to duct 7 is a blower 9 of known kind, suitably arranged to force cool air into the ducts and nozzles.

Referring to Figs. 3 and 5, the nozzles 8 preferably extend transversely of the conveyor band 1 and have their outlets in close proximity to the conveyor band and directed at right angles thereto so that relatively small jets of air are blown at high velocity against the conveyor bottom, producing a maximum of cooling effect.

A further increase in cooling efficiency and effectiveness is made possible by a hood or tunnel 10, shown in Figs. 1, 2, 3, and 5, which is placed over the conveyor and around the sides thereof to enclose the cooling nozzles, so that air coming from the under side of the conveyor is directed upwardly and over the top of the goods thereon, obtaining a maximum cooling effect from the air and substantially reducing operating costs, particularly if refrigerated air be used. The hood 10 discharges to the atmosphere through a stack, or stacks, 11.

The application of the invention in the final cooling of the goods on the packing conveyor is shown diagrammatically in Figs. 4 and 5. A longitudinal duct 12 is placed beneath or alongside this conveyor and is provided with transverse nozzles 13, as in the application of the system first described. These nozzles direct cool air upwardly through the perforations or meshes on the cooling conveyor 5 and between the biscuits that have been placed on edge, as shown in Fig. 5. This cools the goods rapidly to a temperature at which they may comfortably be handled by the packing operators, and permits shortening of the packing conveyor.

Convenient arrangements of the nozzle, whereby uniform cooling of the metal baking conveyor 1 from edge to edge is attained, are shown in Figs. 6 and 7. Fig. 6 shows a preferred arrangement of nozzles on the duct 7, wherein nozzles 8a with short outlet slots are located between the longer nozzles 8, so that a greater volume of cool air is blown against the mid-section of the conveyor band 1 than is blown along its edges. This insures uniform cooling of the metal band and offsets the tendency to warp which heretofore has caused trouble.

Fig. 7 shows an improved nozzle 8c extending the full width of the conveyor, and having an outlet slot 8d which is wider at its middle than at its ends, whereby a greater volume of air is blown against the middle of the conveyor than against its edges.

Having thus described my invention, what I claim and desire to secure by Letters Patent is:

1. In combination with a band conveyor, a plurality of nozzles positioned beneath said conveyor and arranged to direct jets of cool air upwardly against the under side of the conveyor, a greater part of the aggregate area of the nozzle openings being located near the center than along the edges of the conveyor, a duct communicating with said nozzles, and a blower connected to said duct for supplying cool air under pressure to said nozzles.

2. The combination claimed in claim 1, wherein a plurality of spaced elongated nozzles extend transversely of the conveyor and are arranged to deliver jets of cool air across the full width of the conveyor, and shorter nozzles are located between and lie parallel to the longer nozzles to deliver air against the mid-section only of the conveyor.

3. The combination claimed in claim 1, wherein the nozzles lie substantially transversely of the conveyor, and are provided with elongated air outlet slots extending the full width of the conveyor, said slots being wider at their mid-section and narrower toward their ends, whereby a greater volume of cold air is blown against the mid-portion of the conveyor than against its edges.

4. The combination claimed in claim 1, having a hood or tunnel enclosing the top and the outer edges of the conveyor, to direct the cooling air coming from beneath over the upper surface of the conveyor.

FRIEDRICH HAUG.